(12) United States Patent
Minagawa et al.

(10) Patent No.: US 11,537,144 B2
(45) Date of Patent: Dec. 27, 2022

(54) DISPLAY CONTROL DEVICE AND DISPLAY CONTROL METHOD

(71) Applicant: KOMATSU LTD., Tokyo (JP)

(72) Inventors: Masanori Minagawa, Tokyo (JP); Jun Morinaga, Tokyo (JP); Yasuhiro Ohyama, Tokyo (JP); Qi Ding, Tokyo (JP)

(73) Assignee: Komatsu Ltd., Tokyo (JP)

(*) Notice: Subject to any disclaimer, the term of this patent is extended or adjusted under 35 U.S.C. 154(b) by 553 days.

(21) Appl. No.: 16/611,528

(22) PCT Filed: Sep. 27, 2018

(86) PCT No.: PCT/JP2018/035870
§ 371 (c)(1),
(2) Date: Nov. 7, 2019

(87) PCT Pub. No.: WO2019/065809
PCT Pub. Date: Apr. 4, 2019

(65) Prior Publication Data
US 2020/0125114 A1 Apr. 23, 2020

(30) Foreign Application Priority Data
Sep. 29, 2017 (JP) .............................. JP2017-191827

(51) Int. Cl.
*B60Q 5/00* (2006.01)
*G05D 1/02* (2020.01)
*E02F 9/20* (2006.01)
*E02F 9/26* (2006.01)
(Continued)

(52) U.S. Cl.
CPC ............. *G05D 1/0282* (2013.01); *E02F 9/20* (2013.01); *E02F 9/26* (2013.01); *H04N 7/18* (2013.01); *H04Q 9/00* (2013.01)

(58) Field of Classification Search
CPC ......... G05D 1/0282; G05D 2201/0202; G05D 1/0038; E02F 9/20; E02F 9/26; E02F 9/264; H04N 7/18; H04N 7/183; H04Q 9/00
See application file for complete search history.

(56) References Cited

U.S. PATENT DOCUMENTS 9,864,375 B1 * 1/2018 Kirkhope .................. E02F 9/00
10,017,112 B2 * 7/2018 Kowatari ............... G08G 1/166
10,240,457 B2 * 3/2019 Kawai ..................... E21C 41/22
(Continued)

FOREIGN PATENT DOCUMENTS

JP          10275015        10/1998
JP         2006279648       10/2006
(Continued)

OTHER PUBLICATIONS

PCT International Search Report and Written Opinion in International Appln. No. PCT/JP2018/035870, dated Dec. 25, 2018, 11 pages (with English Translation of International Search Report).

*Primary Examiner* — Masud Ahmed
(74) *Attorney, Agent, or Firm* — Fish & Richardson P.C.

(57) ABSTRACT

A display control device includes an image receiving unit that receives an image captured by an imaging device included in a work machine and a display control unit that processes the image based on a movement amount of the work machine in receipt delay time of the image, and generates a display signal.

16 Claims, 9 Drawing Sheets

(51) Int. Cl.
*H04N 7/18* (2006.01)
*H04Q 9/00* (2006.01)

(56) References Cited

U.S. PATENT DOCUMENTS

| | | | |
|---|---|---|---|
| 2012/0232763 A1* | 9/2012 | Mizuochi | E02F 9/264 |
| | | | 701/50 |
| 2015/0057886 A1* | 2/2015 | Larsson | B60W 30/10 |
| | | | 701/41 |
| 2017/0016210 A1* | 1/2017 | Kowatari | G06T 11/60 |
| 2017/0114526 A1 | 4/2017 | Yasuda et al. | |
| 2017/0121946 A1* | 5/2017 | Cai | H04N 7/183 |
| 2019/0345696 A1* | 11/2019 | Hansby | E02F 9/264 |
| 2020/0058177 A1* | 2/2020 | Kawamoto | G01B 11/00 |

FOREIGN PATENT DOCUMENTS

| | | | |
|---|---|---|---|
| JP | 2010248703 | | 11/2010 |
| JP | 2012107395 A | * | 6/2012 |
| JP | 2013168778 | | 8/2013 |
| JP | 2017022433 | | 1/2017 |
| WO | WO2016056674 | | 4/2016 |

\* cited by examiner

DISPLAY CONTROL DEVICE AND DISPLAY CONTROL METHOD

CROSS-REFERENCE TO RELATED APPLICATIONS

This application claims priority to International Application No. PCT/JP2018/035870 filed on Sep. 27, 2018, which claims priority to Japanese Patent Application No. 2017-191827, filed on Sep. 29, 2017, the contents of each are incorporated herein in their entirety.

TECHNICAL FIELD

The present invention relates to a display control device and a display control method which are for an image captured by a work machine.

BACKGROUND ART

A technique of remotely operating a work machine is known as disclosed in Patent Document 1. According to Patent Document 1, the work machine includes an imaging device, and transmits a distant image captured by the imaging device to a monitoring station. The monitoring station includes a display unit, and an operator operates the work machine while looking at the distant image displayed on the display unit.

At this time, in order to prevent a decrease in operability caused by a delay of image transmission, the monitoring station changes distance data of the distant image by a movement distance in transmission delay time, and performs coordinate transformation based on a rotation angle in the delay time.

CITATION LIST

Patent Literature

[Patent Document 1] Japanese Unexamined Patent Application, First Publication No. H10-275015

DISCLOSURE OF INVENTION

Technical Problem

The imaging device included in the work machine is not necessarily limited to being capable of capturing a distant image. In this case, a display control device cannot prevent a decrease in operability caused by a delay of image transmission through a method disclosed in Patent Document 1.

An object of an aspect of the present invention is to provide a display control device and a display control method that can prevent a decrease in operability caused by a delay of image transmission.

Solution to Problem

According to a first aspect of the present invention, a display control device includes an image receiving unit that receives an image captured by an imaging device included in a work machine and a display control unit that processes the image based on a movement amount of the work machine in receipt delay time of the image, and generates a display signal.

Advantageous Effects of Invention

The display control device according to the above aspect can prevent a decrease in operability caused by a delay of image transmission.

BEST MODE FOR CARRYING OUT THE INVENTION

First Embodiment

Figure 1:
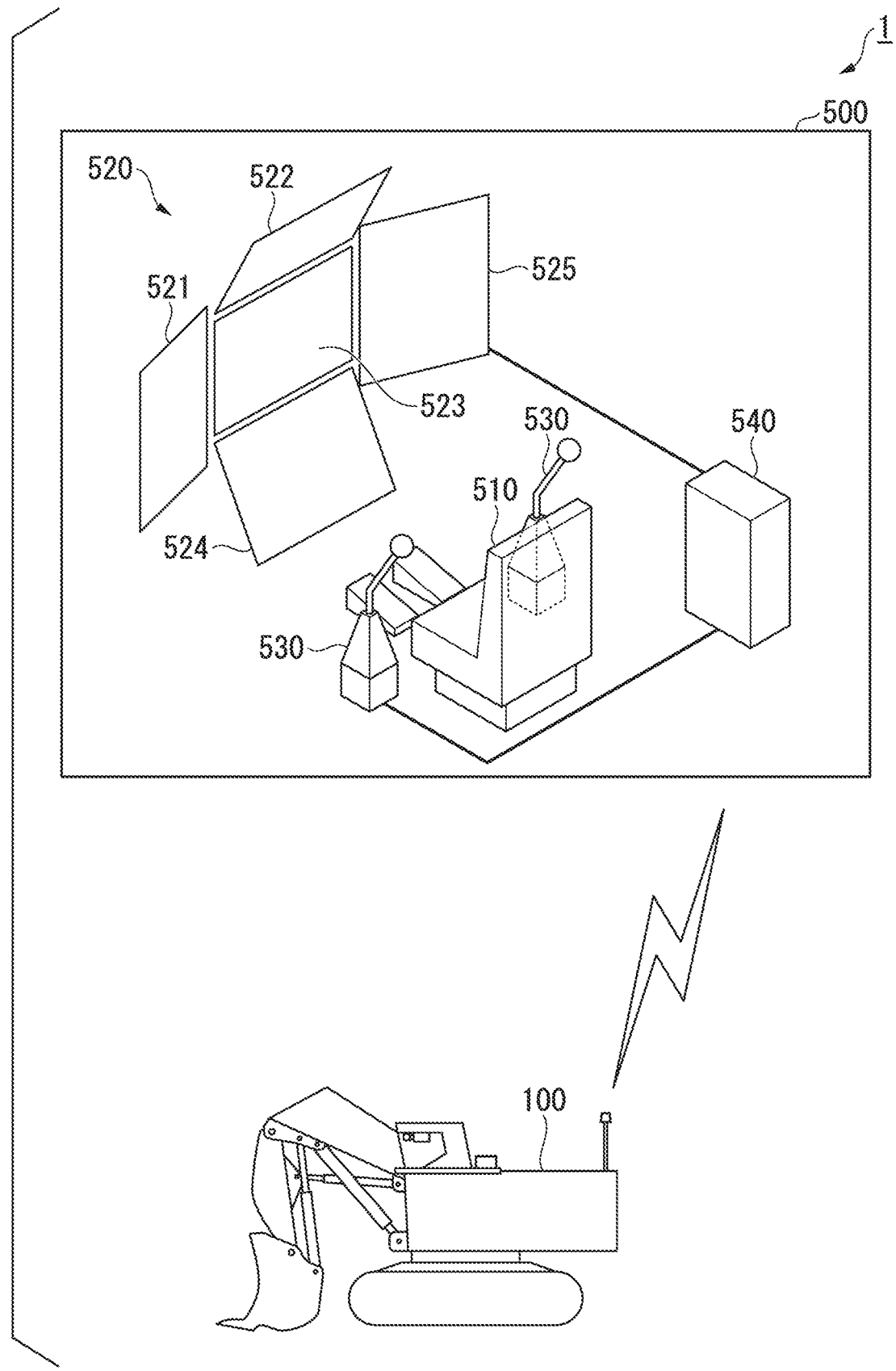
FIG. 1 is a schematic view showing a configuration of a remote operation system according to a first embodiment.

<System>
FIG. 1 is a schematic view showing a configuration of a remote operation system according to a first embodiment.

A remote operation system 1 includes a work machine 100 that is operated by remote operation and a remote operation room 500. The work machine 100 is provided in a work site (for example, a mine or a quarry). The remote operation room 500 is provided in the work site or a spot separated away from the work site (for example, in a town or in the work site). The work machine 100 and the remote operation room 500 are connected to each other via a network such as the Internet.

The remote operation system 1 is a system for operating the work machine 100 by using the remote operation room 500.

The work machine 100 operates in accordance with an operation signal received from the remote operation room 500.

The operation signal is transmitted to the work machine 100 by operation of an operator.

Figure 2:
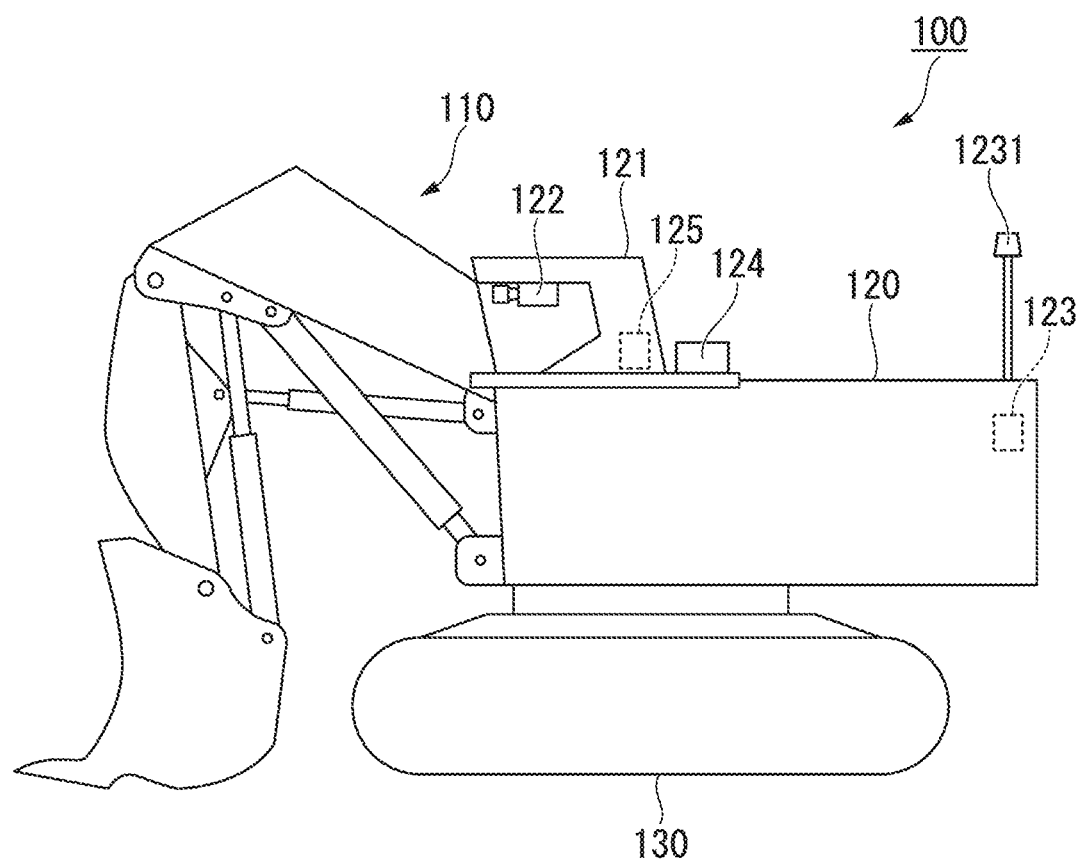
FIG. 2 is an external view of a work vehicle according to the first embodiment.

<Work Machine>
FIG. 2 is an external view of the work machine according to the first embodiment.

The work machine 100 according to the first embodiment is a hydraulic shovel. The work machine 100 according to another embodiment may be a work machine other than the hydraulic shovel, for example, a wheel loader and a bulldozer.

The work machine 100 includes a work equipment 110 that is operated by a hydraulic pressure, a swing body 120 that supports the work equipment 110, and a traveling body 130 that supports the swing body 120.

The swing body 120 includes an operator cab 121. An imaging device 122 is provided in an upper portion of the operator cab 121. The imaging device 122 is provided on the upper front in the operator cab 121. The imaging device 122 captures an image (for example, a moving image) of the front of the operator cab 121 through a windshield in the front of the operator cab 121. An imaging device in which, for example, a charge-coupled device (CCD) sensor and a complementary metal-oxide semiconductor (CMOS) sensor are used is given as an example of the imaging device 122. In another embodiment, the imaging device 122 may not necessarily be provided in the operator cab. It is sufficient that the imaging device 122 is provided at a position where the imaging device can image at least a work target of the swing body 120 and the work equipment 110.

The work machine 100 includes the imaging device 122, a position and orientation calculator 123, an inclination measuring instrument 124, and a control device 125.

The position and orientation calculator 123 calculates a position of the swing body 120 and an orientation where the swing body 120 faces. The position and orientation calculator 123 includes two receivers 1231 that each receives a positioning signal from a satellite configuring a GNSS. The two receivers 1231 are provided at positions in the swing body 120, which are different from each other. The position and orientation calculator 123 detects a position of a representative point of the swing body 120 in a site coordinate system (the origin of a car body coordinate system) based on the positioning signals received by the receivers 1231.

The position and orientation calculator 123 calculates an orientation where the swing body 120 faces as a relationship of a position where one receiver 1231 is provided to a position where the other receiver 1231 is provided, by using each positioning signal received by the two receivers 1231.

The inclination measuring instrument 124 measures an acceleration and an angular velocity of the swing body 120, and detects a posture (for example, a roll angle, a pitch angle, and a yaw angle) of the swing body 120 based on the measurement result. The inclination measuring instrument 124 is provided, for example, on a lower surface of the operator cab 121. The inclination measuring instrument 124 can use, for example, an inertial measurement unit (IMU).

The control device 125 includes an image encoding device (not shown), and encodes (compresses) an image captured by the imaging device 122. The control device 125 transmits, to the remote operation room 500, an encoded image, a position and an orientation, which are measured by the position and orientation calculator 123, a traveling speed and a traveling direction of the traveling body 130, and a swing speed and a posture of the swing body 120, which are measured by the inclination measuring instrument 124. Hereinafter, the swing speed, the traveling speed, the position, the orientation, and the posture will also be referred to as car body information of the work machine 100. The car body information according to another embodiment is not limited thereto. For example, the car body information according to another embodiment may not include any one of the traveling speed, the position, the orientation, and the posture, may include a value detected by another sensor, or may include a value calculated from the detected value. The image encoding device may be provided separately from the control device 125.

The control device 125 receives an operation signal from the remote operation room 500. The control device 125 drives the work equipment 110, the swing body 120, or the traveling body 130 in accordance with the received operation signal.

In addition, the control device 125 transmits the signal transmitted from the remote operation room 500 back to the remote operation room 500 as a response signal.

<Remote Operation Room>

The remote operation room 500 includes an operation seat 510, a display device 520, an operation device 530, and a control device 540 as shown in FIG. 1.

The display device 520 is disposed in front of the operation seat 510. The display device 520 is positioned in front of the eyes of an operator when the operator has sat in the operation seat 510. The display device 520 is configured with a display 521, a display 522, a display 523, a display 524, and a display 525, which are arranged as shown in FIG. 1. In another embodiment, the number of displays configuring the display device 520 is not limited thereto. For example, the display device 520 may be configured with a plurality of arranged displays as shown in FIG. 1, or may be configured with one large display. In addition, the display device 520 may cause a projector to project an image onto a curved surface or a spherical surface.

The operation device 530 is disposed in the vicinity of the operation seat 510. The operation device 530 is positioned within an area where an operator can operate when the operator has sat in the operation seat 510. The operation device 530 includes, for example, an electric lever and an electric pedal.

The control device 540 causes the display device 520 to display an image received from the work machine 100, and transmits an operation signal indicating operation of the operation device 530 to the work machine 100.

Figure 3:
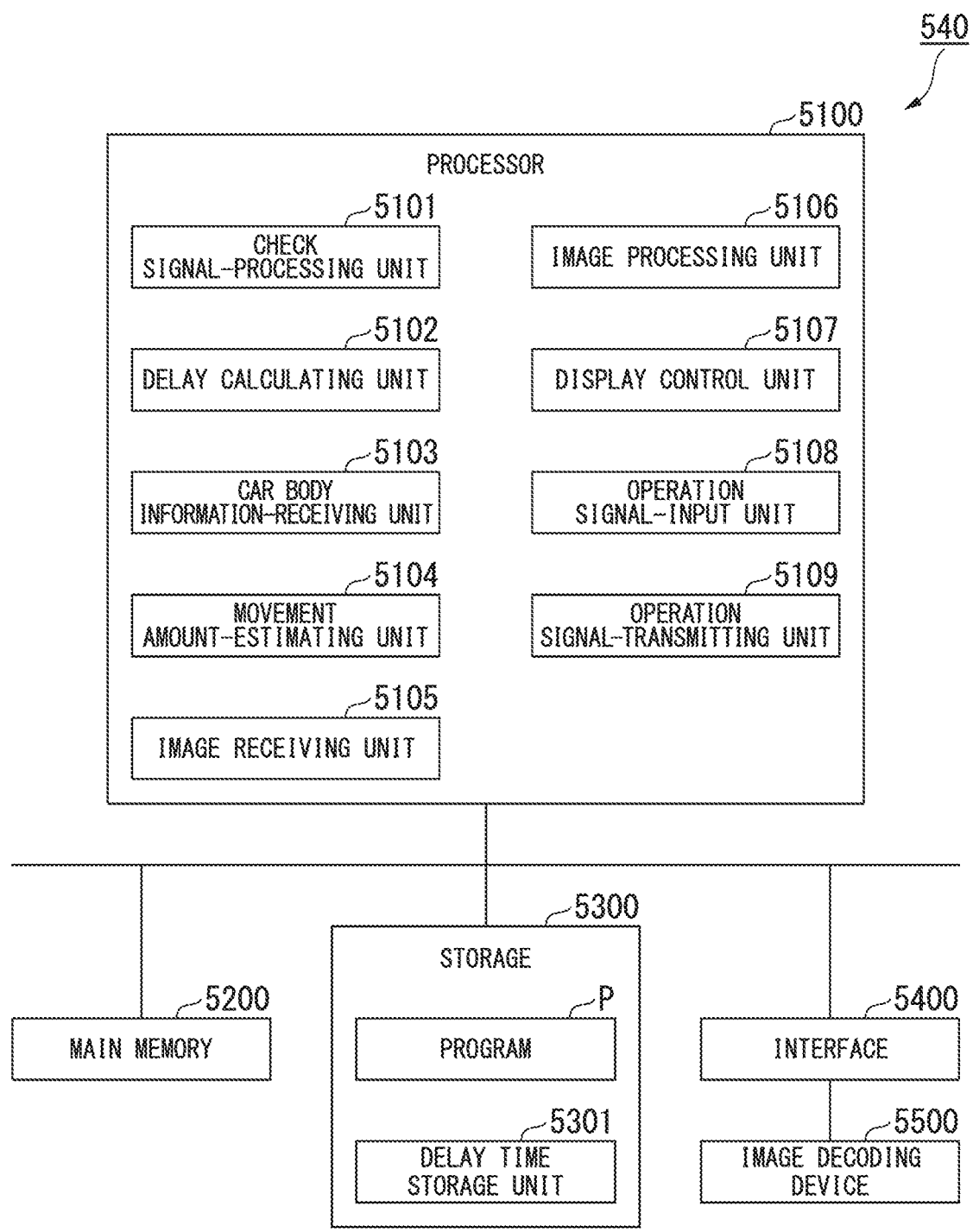
FIG. 3 is a schematic block diagram showing a configuration of a control device of a remote operation room according to the first embodiment.

FIG. 3 is a schematic block diagram showing a configuration of the control device of the remote operation room according to the first embodiment.

The control device 540 is a computer including a processor 5100, a main memory 5200, a storage 5300, an interface 5400, and an image decoding device 5500. The storage 5300 stores a program P. The processor 5100 reads the program P from the storage 5300 to load into the main memory 5200, and executes processing in accordance with the program P. The control device 540 is connected to the network via the interface 5400. In addition, the control device 540 is connected to the image decoding device 5500 via the interface 5400. The image decoding device 5500 decodes an encoded image.

The storage 5300 has a storage area as a delay time storage unit 5301. Examples of the storage 5300 include a HDD, an SSD, a magnetic disk, a magneto-optical disk, a CD-ROM, a DVD-ROM, a semiconductor memory, and the like. The storage 5300 may be an internal medium directly connected to a common communication line of the control device 540, or may be an external medium connected to the control device 540 via the interface 5400. The storage 5300 is a non-temporary tangible storage medium.

The delay time storage unit 5301 stores an image display delay time between the work machine 100 and the control device 540. The image display delay time is the time from when an image is captured by the imaging device 122 to when the image is displayed onto the display device 520.

The processor 5100 includes a check signal-processing unit 5101, a delay calculating unit 5102, a car body information-receiving unit 5103, a movement amount-estimating unit 5104, an image receiving unit 5105, an image processing unit 5106, a display control unit 5107, an operation signal-input unit 5108, and an operation signal-transmitting unit 5109, by execution of the program P.

The check signal-processing unit 5101 transmits a check signal for checking a communication state with the work machine 100 to the work machine 100. A time stamp indicating transmission time of the check signal is stored in the check signal. The check signal-processing unit 5101 receives a response signal with respect to the check signal from the work machine 100. The response signal is a signal including information of the check signal. By receiving the response signal, it is possible to check that the connection between the control device 540 and the work machine 100 is continued.

The delay calculating unit 5102 calculates a communication round-trip delay time based on a difference between a transmission time included in a response signal, that is, a transmission time of a check signal and a receipt time of the response signal. The delay calculating unit 5102 calculates a communication one-way delay time, that is, an image receipt delay time, by dividing the round-trip delay time by two. The delay calculating unit 5102 calculates an image display delay time by adding an encoding processing time for the image encoding device and a decoding-processing time for the image decoding device 5500 to the image receipt delay time. The encoding processing time and the decoding processing time are values measured in advance. The delay calculating unit 5102 stores the image display delay time in the delay time storage unit 5301.

The car body information-receiving unit 5103 receives car body information from the work machine 100.

The movement amount-estimating unit 5104 calculates a swing angle in the display delay time based on the display delay time stored in the delay time storage unit 5301 and a swing speed included in car body information received by the car body information-receiving unit 5103. The movement amount-estimating unit 5104 calculates a traveling distance in the display delay time based on the display delay time stored in the delay time storage unit 5301 and a traveling speed included in car body information received by the car body information-receiving unit 5103. Both of the swing angle of the swing body 120 and the traveling distance of the work machine 100 are examples of the movement amount of the work machine 100.

The image receiving unit 5105 receives an image from the work machine 100. The image is an image decoded by the image decoding device 5500.

The image processing unit 5106 processes the received image based on a movement amount estimated by the movement amount-estimating unit 5104, and generates a display signal. The image processing unit 5106 shifts the received image in a horizontal axis direction by a shift amount according to a calculated swing angle. A relationship between a swing angle and a shift amount of an image is acquired by measuring in advance. In addition, the image processing unit 5106 rescales the received image by enlarging or reducing it with a magnification according to a calculated traveling distance. A relationship between a traveling distance and a magnification of an image is acquired by measuring in advance. In addition, the image processing unit 5106 shifts the received image in a vertical axis direction by a shift amount according to a calculated traveling distance. A relationship between a traveling distance and a shift amount of an image is acquired by measuring in advance. The image processing unit 5106 cuts out a part of a shifted and rescaled image and generates a display signal. That is, the imaging device 122 images an area wider than an area to be displayed onto the display device 520.

The display control unit 5107 outputs the display signal generated by the image processing unit 5106 to the display device 520.

The operation signal-input unit 5108 receives an input of the operation signal from the operation device 530.

The operation signal-transmitting unit 5109 transmits the input operation signal to the work machine 100.

<Method>

Herein, a method of displaying a captured image in the remote operation room 500 according to the first embodiment will be described.

Figure 4:
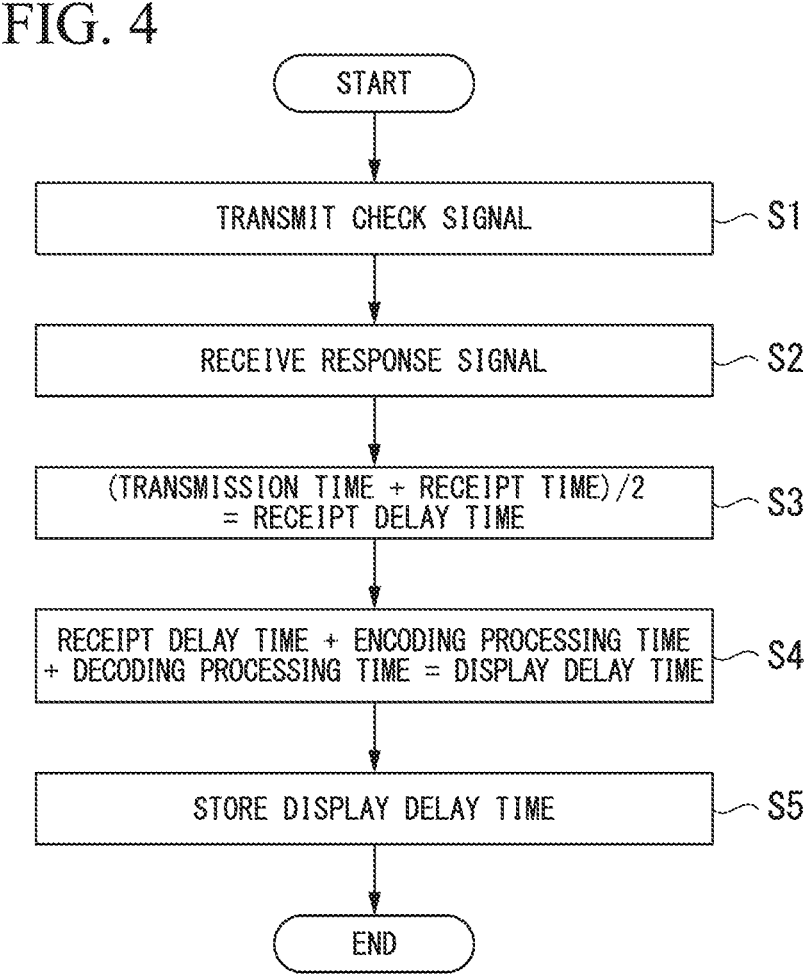
FIG. 4 is a flow chart showing a communication state-checking method for the remote operation room according to the first embodiment.

FIG. 4 is a flow chart showing a communication state-checking method for the remote operation room according to the first embodiment. The control device 540 of the remote operation room 500 periodically executes communication state checking processing shown in FIG. 4.

The check signal-processing unit 5101 of the control device 540 transmits a check signal in which current time is stored to the work machine 100 (Step S1). The control device 125 of the work machine 100 transmits the received check signal without changing the content thereof to the remote operation room 500 as a response signal. The check signal-processing unit 5101 receives the response signal of the check signal from the work machine 100 (Step S2). The delay calculating unit 5102 calculates an image receipt delay time by dividing a difference between the transmission time included in the response signal and the receipt time of the response signal by 2 (Step S3). The delay calculating unit 5102 calculates the image display delay time by adding the encoding-processing time and decoding processing time, which are measured in advance, to the image receipt delay time (Step S4). The delay calculating unit 5102 stores the display delay time in the delay time storage unit 5301 (Step S5).

The control device 540 updates the display delay time stored in the delay time storage unit 5301 by periodically executing the processing.

Figure 5:
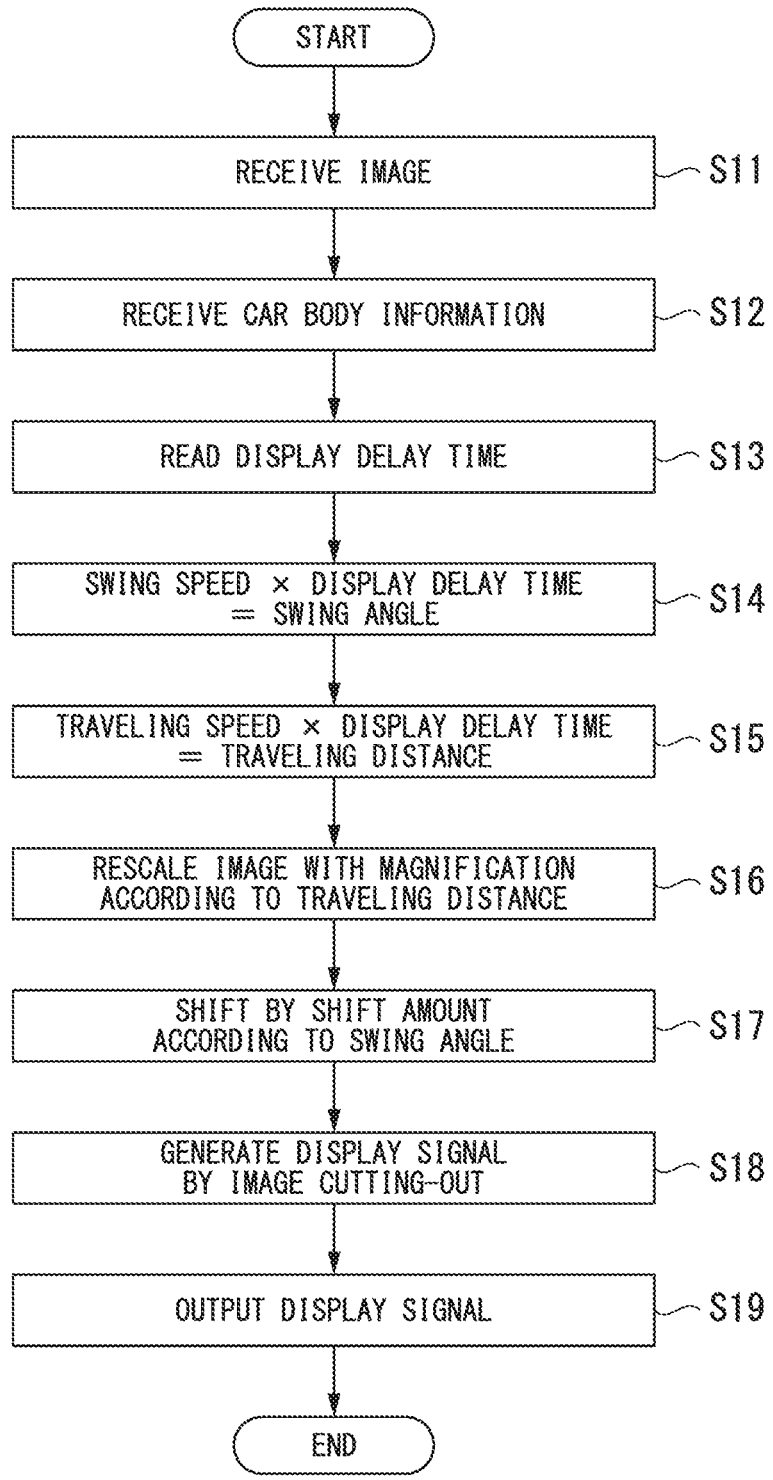
FIG. 5 is a flow chart showing a method of displaying a captured image for the remote operation room according to the first embodiment.

FIG. 5 is a flow chart showing the method of displaying a captured image for the remote operation room according to the first embodiment. The control device 540 of the remote operation room 500 periodically executes communication state checking processing shown in FIG. 5.

The image receiving unit 5105 of the control device 540 receives an image captured by the imaging device 122 from the work machine 100 (Step S11). In addition, the car body information-receiving unit 5103 receives car body information from the work machine 100 (Step S12).

The movement amount-estimating unit 5104 reads the display delay time from the delay time storage unit 5301 (Step S13). The movement amount-estimating unit 5104 calculates a swing angle in the display delay time by multiplying the display delay time by a swing speed included in the car body information received by the car body information-receiving unit 5103 (Step S14). In addition, the movement amount-estimating unit 5104 calculates a traveling distance in the display delay time by multiplying the display delay time by a traveling speed included in the car body information received by the car body information-receiving unit 5103 (Step S15).

The image processing unit 5106 rescales the image received in Step S11 by enlarging or reducing it with a magnification according to the calculated traveling distance (Step S16). In addition, the image processing unit 5106 shifts the image in the horizontal axis direction by a shift amount according to the calculated swing angle (Step S17). The image processing unit 5106 cuts out the rescaled and shifted image in a predetermined size and generates a display signal (Step S18). The display control unit 5107 outputs the display signal to the display device 520 (Step S19). Any one of a change in an image size according to a traveling distance and an image shift according to a swing angle may be applied, or both may be applied.

Action and Effect

As described above, in the first embodiment, the control device 540 processes an image captured by the imaging device included in the work machine 100 based on a movement amount of the work machine 100 in the receipt delay time, and generates a display signal. That is, an image captured the display delay time ago is modified according to the movement amount of the work machine 100 and is displayed onto the display device 520 of the remote operation room 500. Accordingly, since the image displayed on the display device 520 is similar to an image captured by the imaging device 122 at that timing, the control device 540 can prevent a decrease in operability caused by a delay of image transmission, and can contribute to early discovery of an obstacle or collision avoidance. In another embodiment, the control device 540 may modify an image by using the receipt delay time instead of the display delay time. Although the accuracy of correction of an image becomes low as compared with a case where the image is modified by using the display delay time, even when the image is modified by using the receipt delay time, a decrease in operability caused by a delay of image transmission is prevented and an effect of contributing to early discovery of an obstacle or collision avoidance can be obtained, because an image encoding time and an image decoding time are sufficiently short as compared with the image receipt delay time.

In the first embodiment, the control device 540 calculates the display delay time based on the check signal transmission time and response signal receipt time. That is, the control device 540 calculates the display delay time based on only the time of the remote operation room 500. Accordingly, the control device 540 can accurately calculate the display delay time without accurately synchronizing the time of the remote operation room 500 with the time of the work machine 100. On the other hand, if the time of the remote operation room 500 and the time of the work machine 100 are accurately synchronized with each other in another embodiment, the control device 540 may calculate the display delay time by using a difference between the transmission time of a signal by the work machine 100 and the receipt time of the signal by the control device 540.

In another embodiment, an image received by the control device 540 may be buffered such that the display delay time becomes a time determined in advance. In addition, in another embodiment, image processing may be performed with the display delay time as a constant instead of the control device 540 calculating the display delay time. For example, the control device 540 according to another embodiment may include a table in which a communication distance is associated with the delay time, and identify the delay time by referring to the table. Also in this case, an effect of preventing a decrease in operability caused by a delay of image transmission and contributing to early discovery of an obstacle or collision avoidance can be obtained. The control device 540 may not include the check signal-processing unit 5101 and the delay calculating unit 5102 if necessary.

Figure 6:
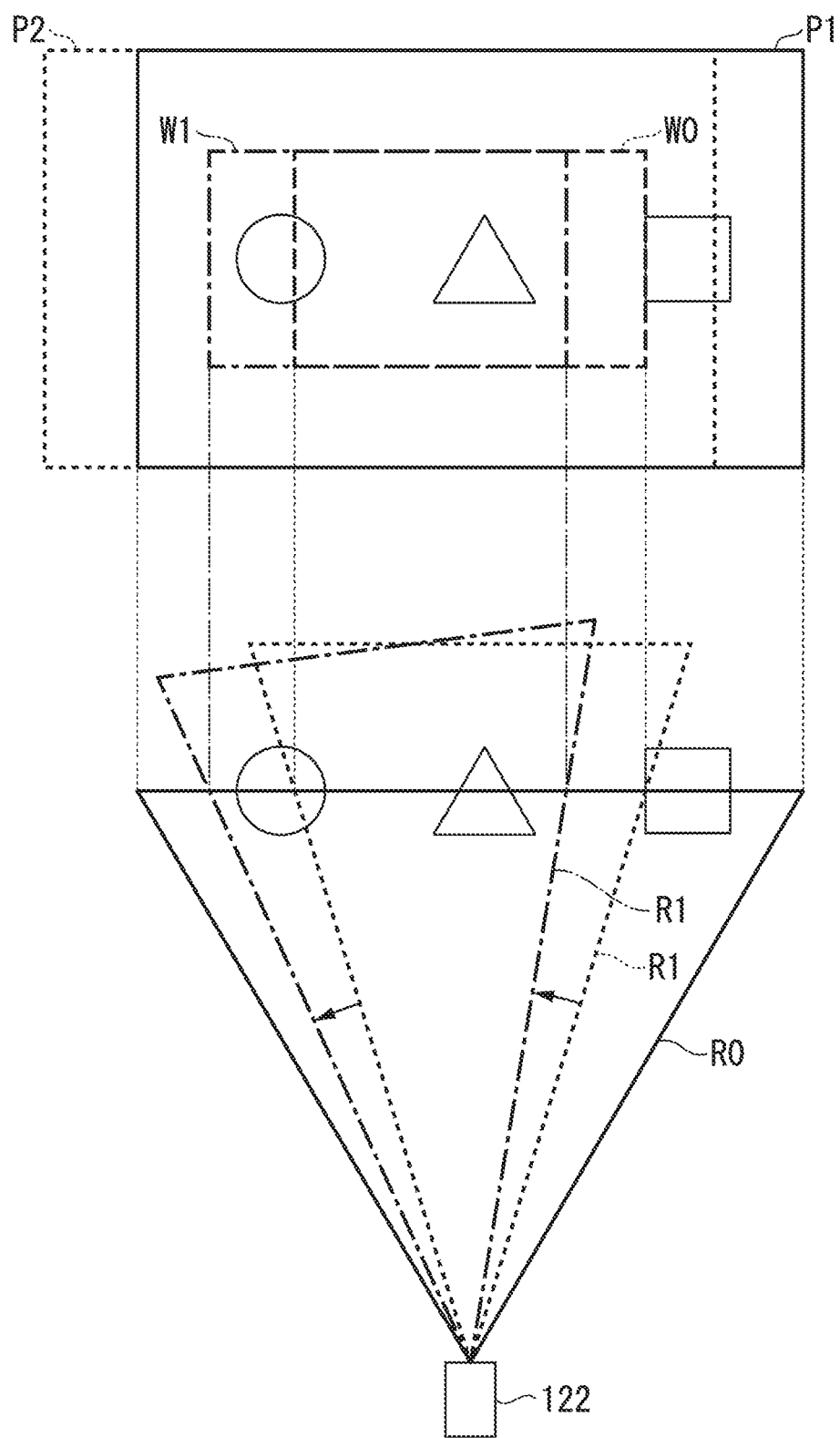
FIG. 6 is an example of a display signal generated when a swing body according to the first embodiment swings left.

FIG. 6 is an example of a display signal generated when the swing body according to the first embodiment swings left. The control device 540 according to the first embodiment estimates a swing angle based on a swing speed of the swing body 120 and the display delay time, and shifts an image by a shift amount in the horizontal axis direction according to the swing angle. Accordingly, the control device 540 can appropriately compensate for the shift of the image caused by the swinging of the swing body 120. As shown in FIG. 6, a range of field of view R1 to be displayed onto the display device 520 is set to be narrower than an imaging area R0 of the imaging device 122 due to image cutting-out. Herein, in a case where the swing body 120 swings left, also the range of field of view R1 swings left. At this time, the control device 540 generates an image P2 by shifting a captured image P1 right. This is equivalent to shifting a cut-out region W1 left relative to the captured image P1 as shown in FIG. 6. Accordingly, a display signal indicating that a region on the left of an original cut-out region W0 (cut-out region which is cut out when the swing body 120 is stationary) is cut out is displayed onto the display device 520. Accordingly, the control device 540 can cause the display device 520 to display an image assumed to be captured in front of the work machine 100 which has swung left in a case where there is no delay time. Without being limited thereto, in another embodiment, the control device 540 may perform, for example, keystone correction according to a swing angle or lens distortion correction, in addition to shifting. In addition, in another embodiment, in a case where the work machine 100 does not include the swing body 120, or a case where a swing speed of the swing body 120 is sufficiently low, such as a case where the work machine 100 is a bulldozer, the control device 540 may not shift the image P1 by swinging.

Figure 7:
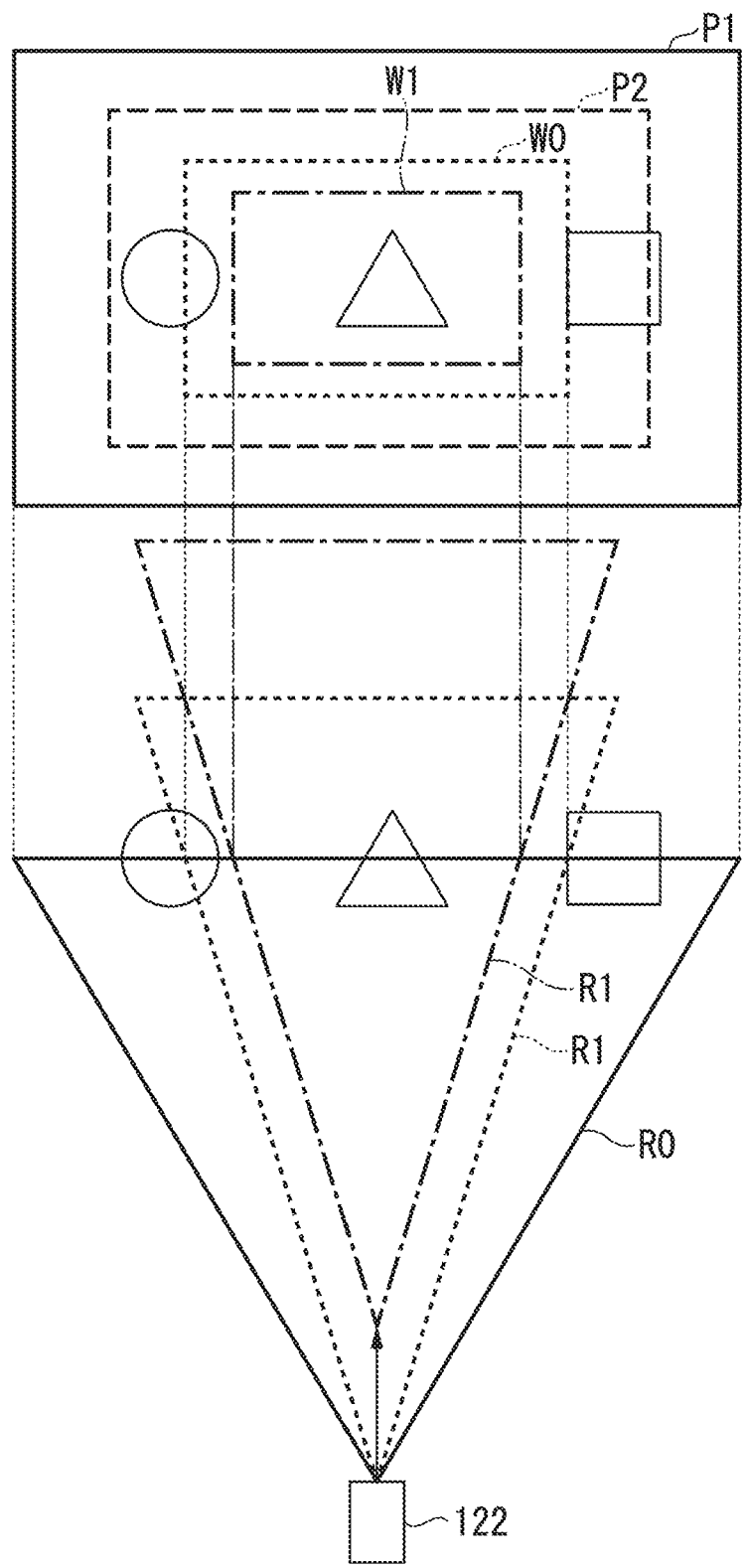
FIG. 7 is an example of a display signal generated when a work machine according to the first embodiment moves forward.

FIG. 7 is an example of a display signal generated when the work machine according to the first embodiment moves forward. The control device 540 according to the first embodiment estimates a traveling distance based on a traveling speed of the work machine 100 and the display delay time, and rescales an image with a magnification according to the traveling distance. Accordingly, the control device 540 can appropriately compensate for a shift of the image caused by traveling of the work machine 100. For example, in a case where the work machine 100 moves forward, also the range of field of view R1 moves forward. At this time, the control device 540 generates the image P2 by enlarging the captured image P1 with a magnification according to a traveling distance. This is equivalent to reducing the cut-out region W1 relative to the captured image P1 as shown in FIG. 7. Accordingly, a display signal indicating that a region on an inner side of the original cut-out region W0 is cut out is displayed onto the display device 520. Accordingly, the control device 540 can cause the display device 520 to display an image which has approached forward in an imaging direction when the work machine 100 moves forward. In a case where the work machine 100 does not travel, or in a case where a traveling speed of the work machine 100 is sufficiently low, the control device 540 may not perform enlargement or reduction of an image based on a traveling distance.

Figure 8:
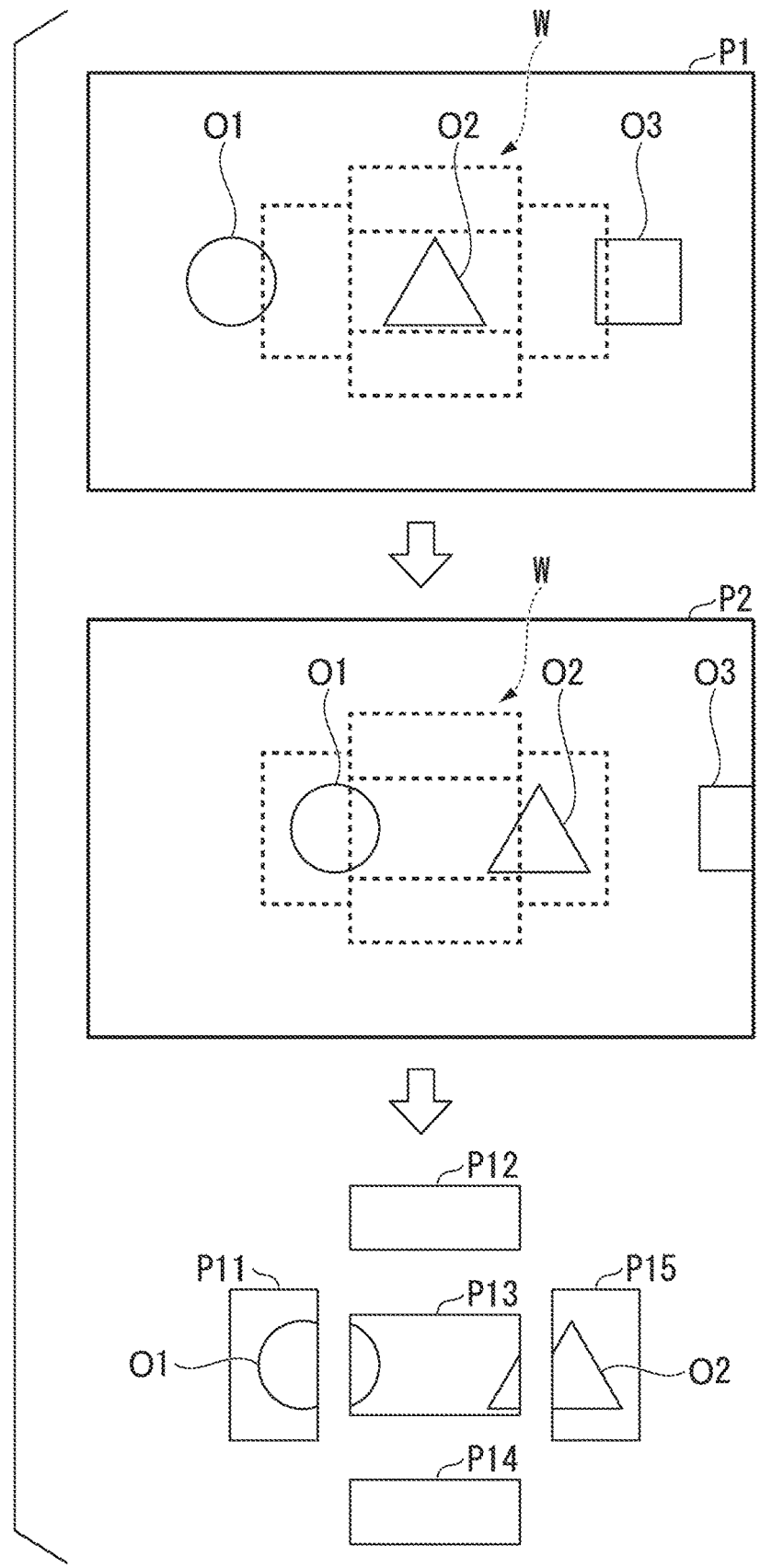
FIG. 8 is an example of an image displayed onto a display device of the remote operation room according to the first embodiment when the swing body swings left.

FIG. 8 is an example of an image displayed onto the display device of the remote operation room according to the first embodiment when the swing body swings left. An image for display in a case where the display device 520 has five displays as shown in FIG. 1 will be described. That is, a cut-out region W of FIG. 8 corresponds to the cut-out region W0 and the cut-out region W1 of FIG. 6. FIG. 8 shows an example in which five images for displaying onto five displays 521-525 shown in FIG. 1 are cut out, and FIG. 6 shows an example in which one image is cut out for convenience of description.

The control device 540 processes the image P1 received from the work machine 100. In the example shown in FIG. 8, the processed image P2 is generated by shifting the captured image P1 right. The control device 540 cuts out each of an image P11 for displaying onto the display 521 configuring the display device 520, an image P12 for displaying onto the display 522, an image P13 for displaying onto the display 523, an image P14 for displaying onto the display 524, and an image P15 for displaying onto the display 525, from the processed image P2. That is, the cut-out region W includes each of a region for cutting out the image P11, a region for cutting out the image P12, a region for cutting out the image P13, a region for cutting out the image P14, and a region for cutting out the image P15.

In the example shown in FIG. 8, objects O1, O2, and O3 appear in the image P1. A part of each of the objects O1 and O3 and the object O2 are included in the cut-out region W before shifting the image P1 right. On the other hand, the objects O1 and O2 are included and the object O3 is not included in the cut-out region W of the image P2 which is after shifting the image P1 right. Therefore, when the cut out images P11 to P15 are displayed onto the display device 520, the object O1 is displayed onto a left display of the display device 520, and the object O2 is displayed onto a right display of the display device 520.

If the images P11 to P15 for displaying onto the displays are cut out from the image P1 before shifting, the object O2 is displayed onto a middle display of the display device 520. Therefore, in a case where the object O2, which is at the center of the field of view at the time of imaging, is displayed on the right of the field of view by the swing body 120 swinging left, the object O2 can be displayed onto the right display of the display device 520 by cutting out the images P11 to P15 for display from the image P1 after shifting. That is, an operator can recognize a state of the left (P11 side) of the work machine 100 when the swing body 120 swings left at an early stage. For example, in a case where the object O1 is an obstacle, the operator can execute operation of collision avoidance, such as stop swinging, at an early stage since the operator can discover the object O1 at an early stage.

Another Embodiment

Although one embodiment has been described in detail with reference to the drawings hereinbefore, a specific configuration is not limited to the description above, and it is possible to make various design modifications or the like.

The control device 540 according to the first embodiment shifts an image by a shift amount according to a swing angle, and rescales the image by enlarging or reducing it with a magnification according to a traveling distance. On the other hand, the control device 540 according to another embodiment may calculate each of a magnification and a shift amount of an image based on a traveling distance under the following method.

The control device 540 according to another embodiment acquires an angle of a difference between the traveling direction of the traveling body 130 of the work machine 100 and the orientation of the swing body 120. Based on the angle, the control device 540 divides a traveling distance into a line-of-sight direction component of the imaging device 122 and a horizontal axis direction component of the imaging device 122. The control device 540 rescales an image with a magnification according to the line-of-sight direction component of the traveling distance. The control device 540 identifies a shift amount according to the horizontal axis direction component of the traveling distance, and shifts the image by a shift amount acquired by adding the shift amount to a shift amount according to a swing angle. Accordingly, as compared with the first embodiment, an image displayed onto the display device 520 can be made similar to an image captured by the imaging device 122 at that timing.

In addition, although the control device 540 according to the first embodiment acquires a traveling distance and a swing angle based on a traveling speed and a swing speed received from the work machine 100, the control device is not limited thereto. For example, the control device 540 according to another embodiment may acquire a traveling distance and a swing angle based on history of an operation signal input in the operation signal-input unit 5108. That is, the control device may acquire a traveling distance and a swing angle by adding up operation signals received by the work machine 100 for the display delay time from the timing when an image received by the image receiving unit 5105 is captured. In this case, the control device 540 acquires a traveling distance and a swing angle based on operation signals from time, which is the display delay time+one-way delay time ago from the receipt time of image by the image receiving unit 5105, to the time which is the one-way delay time ago from the receipt time.

Figure 9:
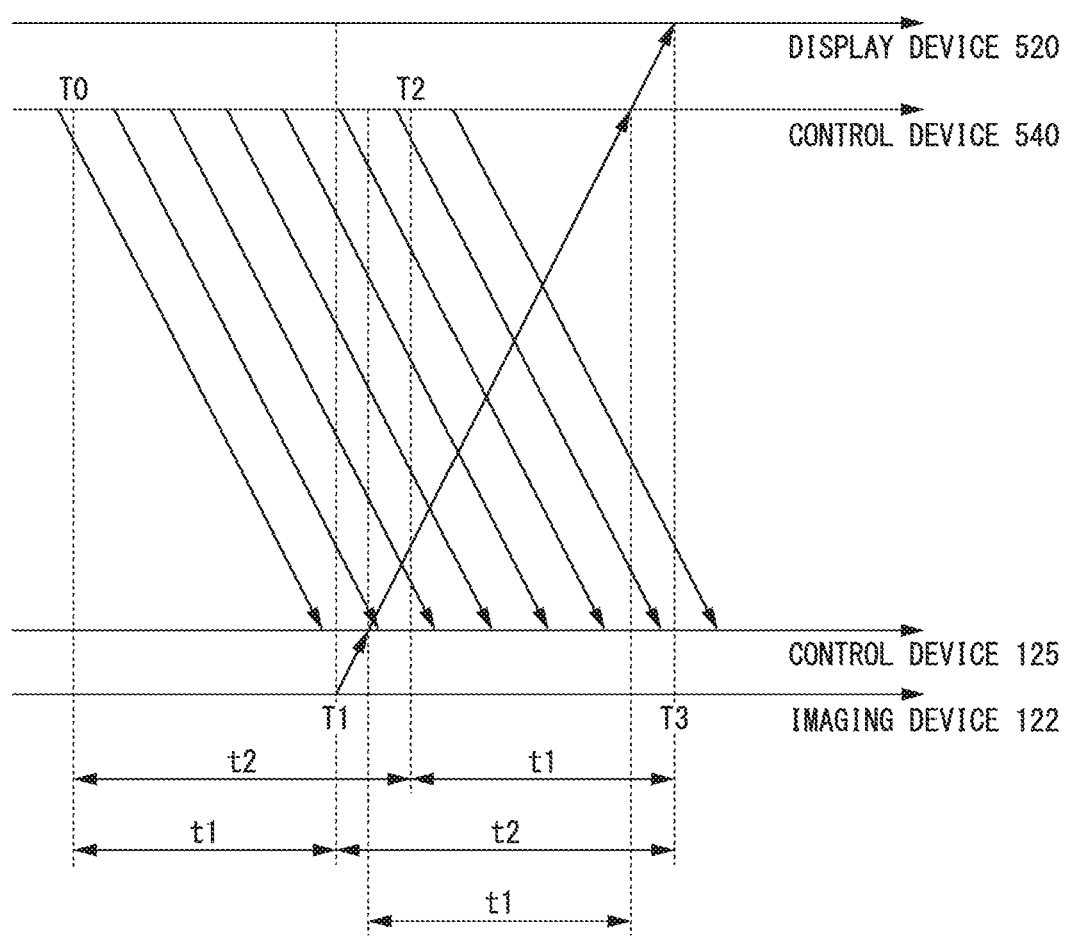
FIG. 9 is a communication sequence diagram showing a relationship between an operation signal and an image.

FIG. 9 is a communication sequence diagram showing a relationship between an operation signal and an image. In the example shown in FIG. 9, the control device 540 periodically transmits an operation signal to the work machine 100. The one-way delay time t1 is not changed by an operation signal and an image. The work machine 100 transmits an operation signal to the control device 540 from time T1 when a certain image is captured to time T3 when the image is displayed on the display device 520. The time from the time T1 to the time T3 is the display delay time t2. The operation signals received from the time T1 to the time T3 are transmitted from time T0, which is the one-way delay time t1 ago from the time T1, to time T2, which is the display delay time t2 later. Herein, the time T2 is the one-way delay time t1 ago from the time T3. Therefore, the control device 540 can appropriately acquire a traveling distance and a swing angle by using operation signals from time, which is the display delay time+one-way delay time ago from the receipt time of image by the image receiving unit 5105, to the time which is one-way delay time ago from the receipt time.

Although a case where the program P is stored in the storage 5300 of the control device 540 according to the aforementioned embodiment has been described, the invention is not limited thereto. For example, in another embodiment, the program P may be delivered to the control device 540 through a communication line. In this case, the control device 540 which has received the delivery loads the program P to the main memory 5200, and executes the processing.

In addition, the program P may be a program for realizing some of the aforementioned functions. For example, the program P may realize the aforementioned functions in combination with another program P that is already stored in the storage 5300 or in combination with another program P that is installed in another device.

In addition, the control device 540 may include a programmable logic device (PLD) in addition to the configuration or instead of the configuration. Examples of the PLD include Programmable Array Logic (PAL), Generic Array Logic (GAL), a complex programmable logic device (CPLD), field-programmable gate array (FPGA), and the like. In this case, some of the functions realized by the processor 5100 may be realized by the PLD.

In addition, the control device 540 may include a plurality of processors 5100, or may be configured with a plurality of computers.

INDUSTRIAL APPLICABILITY

The display control device according to the present invention can prevent a decrease in operability caused by a delay of image transmission.

The invention claimed is:

1. A display control device configured to control one or more displays for a work machine that is remote from the one or more displays, the display control device comprising:
   a processor configured to:
   determine a receipt delay time for communication between the processor and the working machine,
   receive an image captured by an imaging device included in the work machine,
   estimate a movement amount of the work machine for the receipt delay time,
   update the image based on the estimated movement amount of the work machine for the receipt delay time, and
   generate a display signal corresponding to the updated image.

2. The display control device according to claim 1, wherein the processor is further configured to:
   estimate a swing angle of a swing body of the work machine by multiplying a swing speed of the swing body with the receipt delay time; and
   shift the image captured by the imaging device by a shift amount in a horizontal axis direction according to the swing angle to thereby generate the display signal corresponding to the updated image.

3. The display control device according to claim 1, wherein the processor is further configured to:
   transmit a check signal from the processor to the working machine;
   receive a response signal from the working machine in response to the check signal; and
   based on the processor receiving the response signal from the working machine, determine the receipt delay time between the processor and the working machine.

4. The display control device according to claim 1, wherein the processor is further configured to:
   determine a transmission time for transmitting a check signal from the processor to the working machine;
   determine a reception time for receiving a response signal from the working machine to the processor in response to the check signal; and
   determine the receipt delay time based on an average of the transmission time and the reception time.

5. The display control device according to claim 4, wherein the receipt delay time is equal to the average of the transmission time and the reception time.

6. The display control device according to claim 4, wherein a content of the check signal is identical to a content of the response signal.

7. The display control device according to claim 1, wherein the processor is further configured to:
   obtain, from a control device of the working machine, an encoding processing time and a decoding processing time of the image captured by the imaging device; and
   determine a display delay time that is a summation of the receipt delay time, the encoding processing time, and the decoding processing time.

8. The display control device according to claim 7, further comprising a storage device configured to store the display delay time.

9. The display control device according to claim 1, wherein the display control device, the processor, and the one or more displays are located in a remote operation room that is remote from the working machine.

10. A display control method for controlling one or more displays for a work machine that is remote from the one or more displays, the display control method comprising:
    determining a receipt delay time for communication between the working machine and a processor that is configured to control the one or more displays;
    receiving an image captured by an imaging device included in the work machine;
    estimating a movement amount of the work machine for the receipt delay time;
    updating the image based on the estimated movement amount of the work machine for the receipt delay time; and
    generating a display signal corresponding to the updated image.

11. The method according to claim 10, further comprising:
    transmitting a check signal from the processor to the working machine;
    receiving a response signal at the processor from the working machine in response to the check signal; and
    based on the processor receiving the response signal from the working machine, determining the receipt delay time between the processor and the working machine.

12. The method according to claim 10, further comprising:
    determining a transmission time for transmitting a check signal from the processor to the working machine;
    determining a reception time for receiving a response signal from the working machine to the processor in response to the check signal; and
    determining the receipt delay time based on an average of the transmission time and the reception time.

13. The method according to claim 12, wherein the receipt delay time is equal to the average of the transmission time and the reception time.

14. The method according to claim 12, wherein a content of the check signal is identical to a content of the response signal.

15. The method according to claim 10, further comprising:
    obtaining, from a control device of the working machine, an encoding processing time and a decoding processing time of the image captured by the imaging device; and
    determining a display delay time that is a summation of the receipt delay time, the encoding processing time, and the decoding processing time.

16. The method according to claim 15, further comprising storing the display delay time in a storage device.

* * * * *